United States Patent [19]

dos Santos et al.

[11] 4,340,994
[45] Jul. 27, 1982

[54] APPARATUS AND METHOD FOR PRODUCING SIMULATED CUTS OF MEAT

[75] Inventors: Claudio dos Santos; Archie R. McFarland, both of Salt Lake County, Utah

[73] Assignee: Beehive Machinery, Inc., Sandy, Utah

[21] Appl. No.: 123,661

[22] Filed: Feb. 22, 1980

[51] Int. Cl.³ .......................... A22C 7/00; A23J 1/14
[52] U.S. Cl. ................................ 17/45; 99/450.7; 426/246; 426/249; 426/274; 17/32
[58] Field of Search ................. 99/450.1, 450.7; 426/246, 249, 274; 17/32

[56] References Cited

U.S. PATENT DOCUMENTS

| | | | |
|---|---|---|---|
| 2,694,222 | 11/1954 | Spang | 17/32 |
| 2,889,574 | 6/1959 | Thielen et al. | 17/32 X |
| 2,953,461 | 9/1960 | Prohaska | 426/246 |
| 3,147,717 | 9/1964 | Smith | 426/249 X |
| 3,512,213 | 5/1970 | De Villers et al. | 17/32 |
| 3,558,324 | 1/1971 | Page et al. | 426/274 X |
| 3,563,764 | 4/1969 | Posegate | 426/249 X |
| 3,793,466 | 2/1974 | Hawkins | 426/274 |
| 3,881,404 | 5/1975 | Ohkawa | 99/450.7 X |
| 4,200,959 | 5/1980 | Cheney | 17/32 |

Primary Examiner—Willie G. Abercrombie
Attorney, Agent, or Firm—Mallinckrodt & Mallinckrodt

[57] ABSTRACT

A coextrusion apparatus and method for producing simulated cuts of meat from fat and lean meat is improved by providing in the apparatus, means for the controlled heating of parts of the discharge structure leading from the coextrusion die or of the die structure or of both structures to a temperature during the extrusion procedure substantially no greater than will melt fat interfaced with such structure. The preferred heating means is a water jacket supplied with hot water of suitable temperature.

11 Claims, 7 Drawing Figures

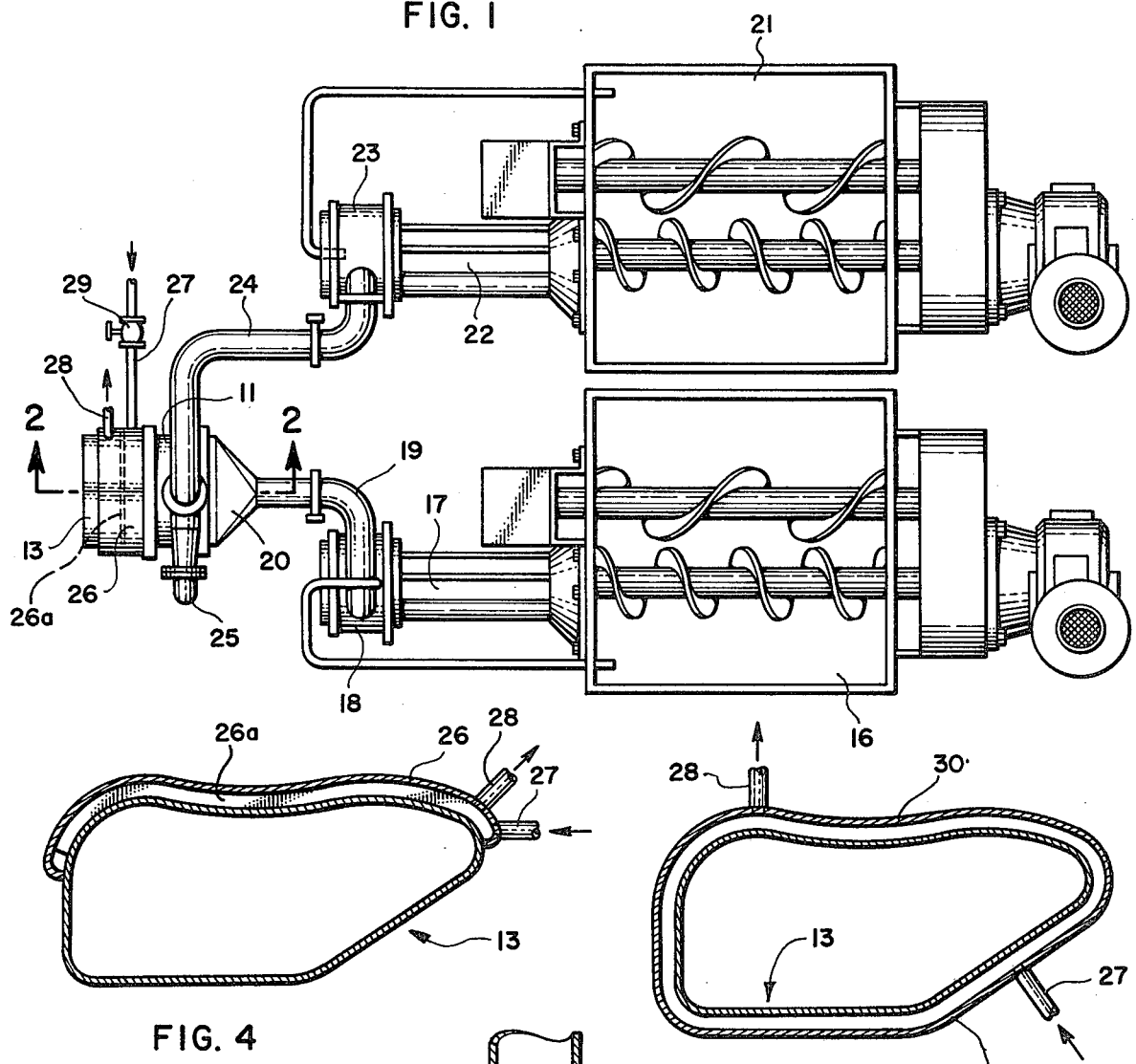
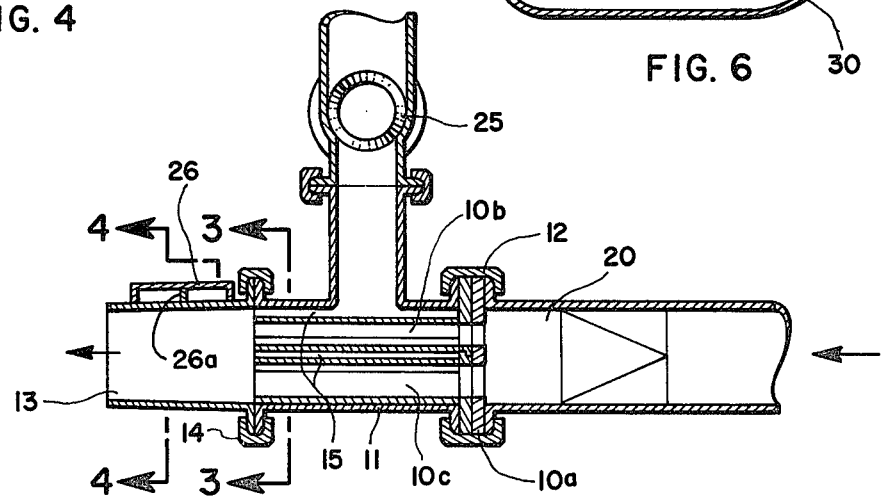

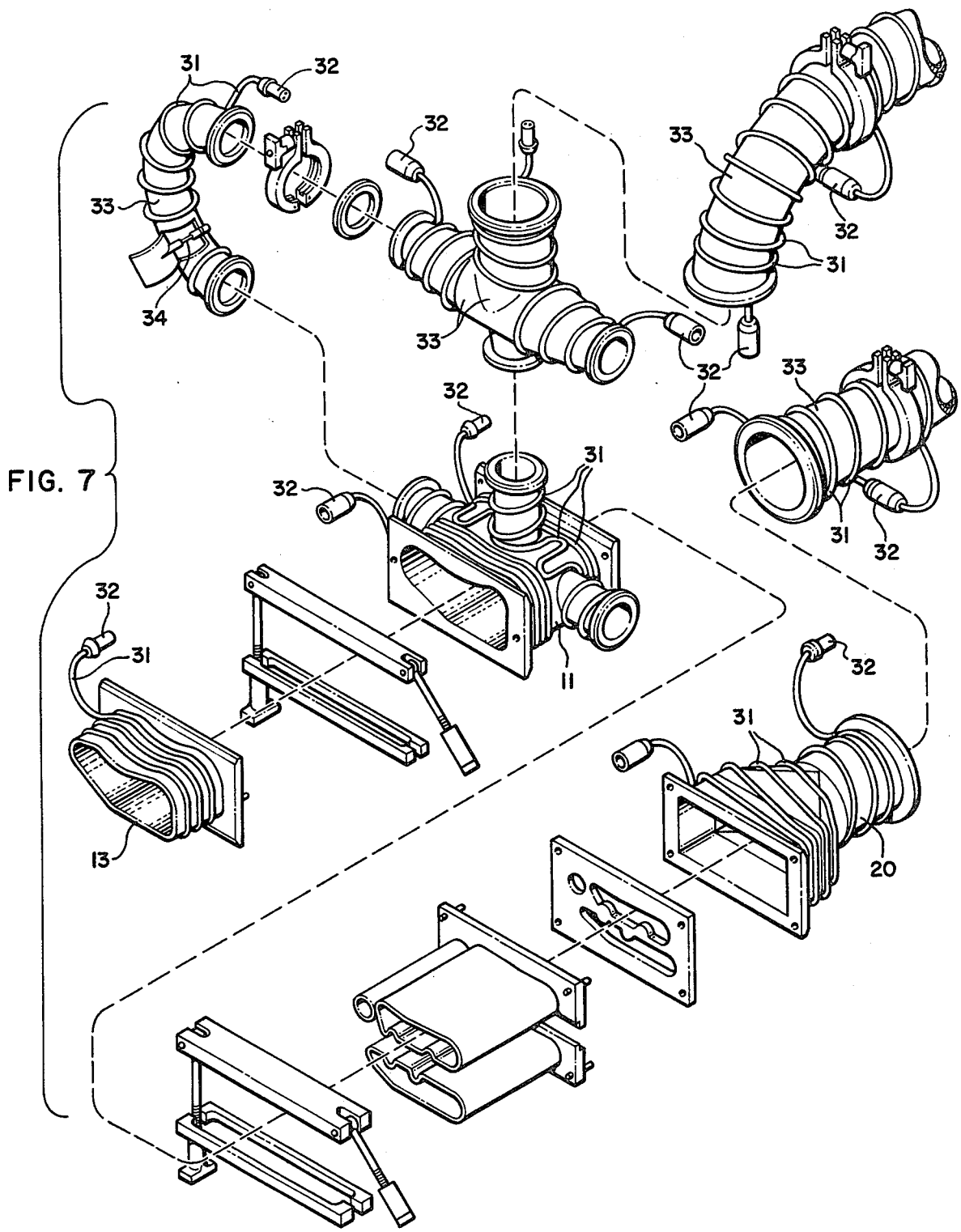

APPARATUS AND METHOD FOR PRODUCING SIMULATED CUTS OF MEAT

BACKGROUND OF THE INVENTION

1. Field

The invention is in the field of apparatus and methods for coextruding fat and relatively lean meat through respectively different portions of an extrusion die to produce simulated cuts of meats, such as bacon, steaks, roasts, etc.

2. State of the Art

Apparatus has been developed heretofore by employees of Beehive Machinery, Inc., Salt Lake City, Utah, for the coextrusion of fat and relatively lean meat to produce various simulated cuts of meat. Such apparatus comprises a compound die, having separate die passages for fat and relatively lean meat components of the final product, and a convergent discharge conduit connected to the outlet end of the die. The fat and lean meat materials, fed under pressure to the respective die passages, are discharged from the die into the discharge conduit and are pressed together therein by reason of the convergent nature of such conduit.

Although the apparatus has proven very successful in practice, difficulty has been experienced in obtaining particular desired patterns of fat and meat and in the reproducibility of particular patterns. It has been found that a variety of factors influence pattern formation in the product other than the particular pattern exhibited by the die itself. Thus, the character of the raw materials, the feeding thereof by the apparatus, the manner of flow through the various conduits of the apparatus all have an influence on the appearance of the final product. Since it is usually desirable that the final product closely simulate natural cuts of meat in appearance as well as in chewability, control of the extrusion procedure has become important. This is demonstrated by improvements (contained in FIGS. 10, 11, and 12 of Archie Rae McFarland et al. continuation-in-part application Ser. No. 956,972, filed Nov. 2, 1978) to the original apparatus of parent application Ser. No. 772,733, filed Feb. 28, 1977, which improvements are in the form of removable plugs for insertion in the conduits leading to the respective die passages as a control for material flow through such conduits.

SUMMARY OF THE INVENTION

In accordance with the present invention, it has been found that desired pattern formation and reproducibility of such formation can be greatly improved if at least those portions of the convergent discharge conduit which are contacted by the fat are heated to a temperature that will slicken the fat interface by melting of the fat thereat so as to prevent drag by reason of the tendency of the fat to cling thereto. In many instances, it will be desirable to heat the discharge conduit around its entire periphery, since even lean meat often has a certain amount of fat included therein, particularly if fat is purposely included to produce a marbling effect.

The application of heat should be controlled so as not to exceed a temperature that will melt more than an interfacial layer of the fat, or heat the product enough to denature protein or stimulate the growth of bacteria. The exact temperature to be employed will depend upon circumstances and can best be determined at the time of a test run on any given materials. It is preferred that the heat be applied by one or more water jackets externally surrounding those portions of the discharge conduit to be heated and the die itself if desired and by the circulation of heated water through such water jacket or jackets during the extrusion procedure.

THE DRAWINGS

In the drawings, which illustrate the best mode presently contemplated for carrying out the invention:

FIG. 1 is a top plan view of the entire coextrusion apparatus which incorporates the present improvement;

FIG. 2, a fragmentary axial vertical section taken along the line 2—2 of FIG. 1 and drawn to a larger scale;

FIG. 3, a transverse vertical section taken along the line 3—3 of FIG. 2 and drawn to a still larger scale;

FIG. 4, a transverse vertical section taken along the line 4—4 of FIG. 2;

FIG. 5 an exploded, pictorial view showing component parts of the extrusion apparatus of the invention;

FIG. 6, a view corresponding to that of FIG. 4, but showing a different embodiment of the invention; and FIG. 7, a view corresponding to that of FIG. 5 but showing electrical heat tape wrapped around various parts of the apparatus as a heat source.

DETAILED DESCRIPTION OF THE ILLUSTRATED EMBODIMENT

Figure 5:
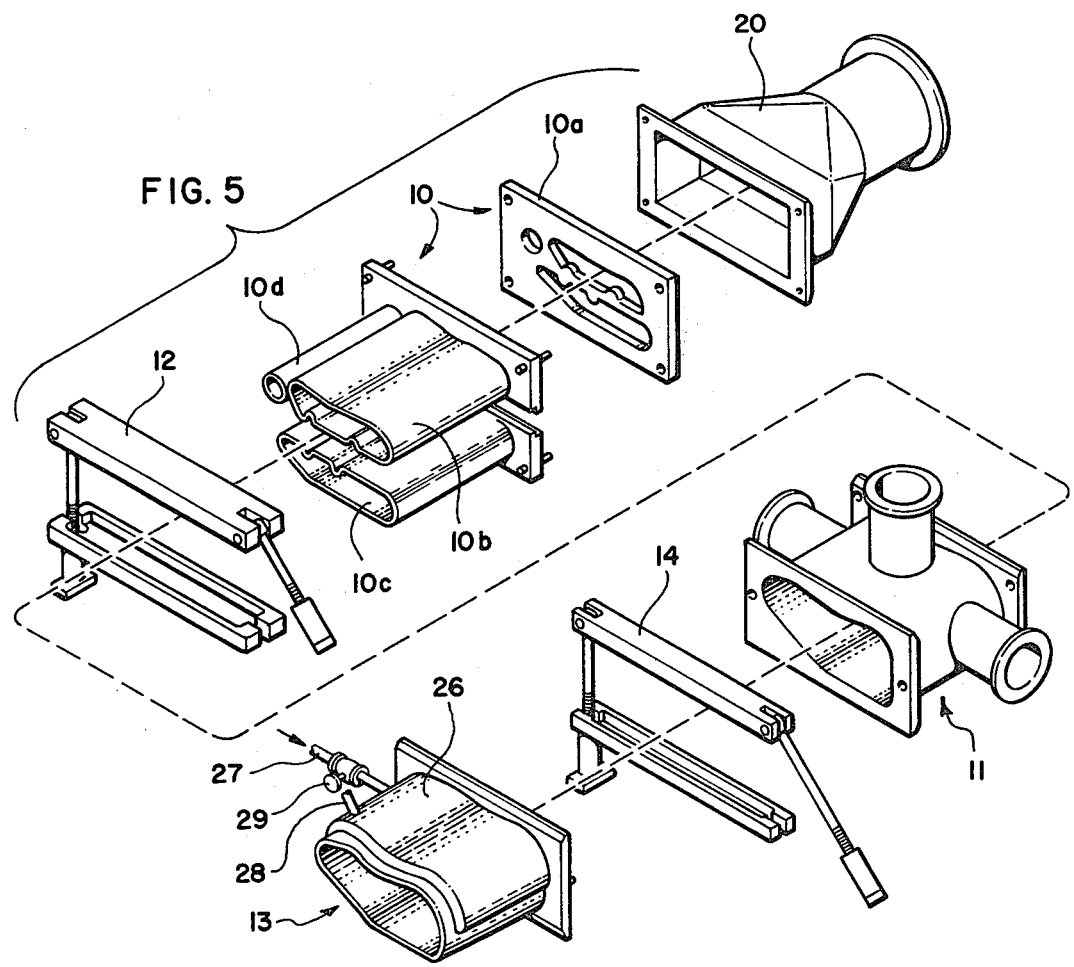

In the preferred form of the apparatus of the invention, see particularly FIG. 5, a compound coextrusion die 10 having any desired pattern for the production of a simulated cut of meat is removably attached to and fitted within die housing 11 for coextrusion purposes by means of a clamp 12, and means in the form of a convergent discharge conduit 13 for consolidating separately extruded meat and fat materials is removably attached to the discharge end of die housing 11 by means of a clamp 14.

Figure 3:
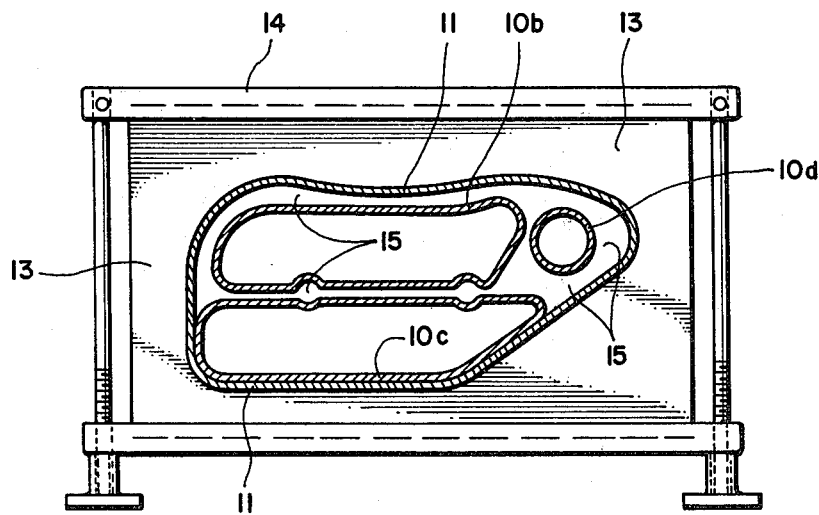

Die 10 includes a front die plate 10a and separate die conduits 10b, 10c, and 10d for the extrusion, in this instance, of a meat material which is very lean. When die 10 is attached to, and the conduits 10b, 10c, and 10d thereof fitted within die housing 11, extrusion passages for a fat material are formed in whatever spaces may exist between the three die conduits themselves and between such die conduits and the inside faces of the die housing, see the passages 15, FIGS. 2 and 3.

As in the Beehive Machinery, Inc. coextrusion apparatus of the aforementioned McFarland et al. U.S. Applications Ser. Nos. 772,733 and 956,972, the die conduits 10b, 10c, and 10d are supplied with material, lean meat in this instance, from a twin screw mixer and feeder 16, through a conduit 17, a food pump 18, a conduit 19, and a plenum fitting 20, while coextrusion passages 15 are supplied with material, fat in this instance, from a second twin screw mixer and feeder 21 through a conduit 22, a food pump 23, a conduit 24, and header or manifold 25 which leads directly into die housing 11.

In accordance with the invention, convergent discharge conduit 13 is subjected to controlled heating in part or entirely to ease the passage of the extruded materials therethrough. Any suitable heating means may be employed for the purpose so long as the temperature is kept no higher than about the melting point of the fat material so that a film of liquefied fat is maintained on at least those portions of the inside face of such discharge conduit 13 contacted by the fat portion of the extruded product. It is preferred that a water jacket be employed and that water of a suitable temperature be circulated through such jacket.

In the embodiment illustrated in FIGS. 1 through 5, a water jacket 26 is applied to the outside of convergent discharge conduit 13 over approximately that portion of the peripheral wall thereof that defines fat extrusion passages 15. Heated water is circulated therethrough from any suitable source of same (not shown) by way of supply and return piping 27 and 28, respectively, under the control of a valve 29, and, as in FIG. 4, of an internal partition 26a which divides the interior of the water jacket into side-by-side, reverse-flow channels. Although water is the preferred heating medium, because of the ease of heat control, any suitable heating fluid can be employed as will be apparent to those skilled in the heating art.

Particularly in instances in which the meat component of the extruded product contains some fat or the fat component encircles the product, it is desirable to heat the discharge conduit over substantially its entire periphery, as in the embodiment of FIG. 6 wherein the water jacket 30 encompasses the entire periphery of the conduit, stopping short only of the terminal end thereof as in the previous embodiment, FIGS. 1 and 2. Whether or not the water jacket extends throughout the entire length of the conduit or comprehends the entire fat-contacting portion of the periphery is immaterial in instances in which the material from which the discharge conduit is fabricated has high heat conductivity, as does stainless steel, the material most commonly used.

The degree of heat employed in each instance will depend upon the melting point of the particular fat concerned and the rate of travel of the material through the apparatus, so that substantially only the interface between fat and discharge conduit wall faces contacted thereby will be melted to ease passage of the material through the apparatus.

The use of heat at various locations throughout the die, as well as the discharge conduit, is sometimes advantageous. Thus, a similar water jacket (not) shown) may be supplied externally of part or all of die housing 11 and suitably interconnected with the water jacket 26 or the water jacket 30 or may be independent thereof and supplied with heated water from a different source of supply. Again, continuous or intermittent, spot or entire heating of the discharge conduit or die, or both, as well as of flow conduits leading to the die may be employed and controlled in any suitable manner known to those skilled in the heating art, for example, by the use of heat pads, directed streams of hot air, radiant devices, etc., to facilitate flow of material through selected portions of the die and discharge conduit relative to other portions so as to produce desired distribution of fat and lean components in the simulation of natural cuts of meat.

Thus, for example, as shown in FIG. 7, electrical heat tape 31 with electrical connection plugs 32 may be wrapped around the die housing 11, the discharge conduit 13, the several conduits (designated 33 in general) through which material is supplied to the die 10, and plenum fitting 20. Any suitable heat control arrangement can be employed, for example, a standard themostatic device such as indicated at 34.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. In apparatus for forming a composite meat and fat product simulating the pattern of a natural commercial cut of meat, which apparatus includes an extrusion die having separate passages for meat and fat, respectively, collectively forming a pattern conforming to a natural commercial cut of mean; means for supplying massed pieces of meat mixed with a binder; means for supplying a mass of fat; meat conduit means leading from said meat supplying means to the die meat passages; means for forcing meat from said meat supplying means through said meat conduit means to and through said die meat passages; means for forcing fat from said fat supplying means through said fat conduit means to and through said fat die passages; and means at the discharge end of said extrusion die for consolidating the separately extruded meat and fat into a column which may be cut transversely at intervals to form simulated natural commercial cuts of meat, the improvement comprising means associated with one or more of said consolidating means, die, and conduit means for heating selected parts thereof which are contacted by said fat relative to other parts thereof which are contacted by said meat to a controlled temperature sufficient to ease the flow of said fat therethrough relative to said meat, the parts contacted by said meat being free of heating means so as to remain unheated relative to the heated parts contacted by the fat.

2. An improvement according to claim 1, wherein the consolidating means is a convergent discharge conduit, and the heating means is arranged to supply heat thereto.

3. An improvement according to claim 2, wherein the heating means comprises a heating jacket formed about the outside of the discharge conduit or of the die, and means for supplying a controlled-temperature heating fluid to said heating jacket.

4. An improvement according to claim 3 wherein the heating means is a water jacket, and the means for supplying a controlled-temperature heating fluid is arranged to supply heated water to said water jacket.

5. An improvement according to either claim 3 or claim 4 wherein the heating means encompasses the entire periphery of the discharge conduit or the die or both.

6. An improvement according to claim 1 wherein the heating means comprises electrical heat tape wrapped around the part or parts to be heated.

7. In a method of fabricating simulated cuts of meat which includes continuously feeding meat material and fat material through respective conduit structures to separate portions of a coextrusion die structure, respectively, and extruding said materials through said die structure and through material-consolidating product discharge structure, the improvement comprising heating portions of one or more of the product discharge structure, the die structure, and the conduit structure contacted by said fat material relative to other portions thereof contacted by said meat material, to a temperature substantially no greater than will melt fat interfaced with one or more of said structures and thereby facilitate pattern control, the portions contacted by said meat remaining unheated relative to the heated portions contacted by the fat.

8. An improvement according to claim 7, wherein the heating is continuous.

9. An improvement according to claim 7, wherein the heating is intermittent.

10. An improvement according to claim 7, wherein the heating is accomplished by circulating hot water.

11. An improvement according to claim 7, wherein the heating is accomplished and controlled electrically.

* * * * *